United States Patent
Morihira et al.

(10) Patent No.: US 11,089,171 B2
(45) Date of Patent: Aug. 10, 2021

(54) RECORDING MEDIUM STORING CONTROL PROGRAM AND ELECTRONIC DEVICE FOR CONTROLLING USE OF FUNCTION

(71) Applicant: SEIKO EPSON CORPORATION, Tokyo (JP)

(72) Inventors: Ryo Morihira, Nagano (JP); Kikuo Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/886,880

(22) Filed: May 29, 2020

(65) Prior Publication Data

US 2020/0382664 A1  Dec. 3, 2020

(30) Foreign Application Priority Data

May 31, 2019  (JP) .............................. JP2019-102217

(51) Int. Cl.
  *H04N 1/00*  (2006.01)
(52) U.S. Cl.
  CPC ..... *H04N 1/00511* (2013.01); *H04N 1/00392* (2013.01); *H04N 1/00411* (2013.01)
(58) Field of Classification Search
  None
  See application file for complete search history.

(56) References Cited

U.S. PATENT DOCUMENTS

| | | | | |
|---|---|---|---|---|
| 2004/0239700 A1* | 12/2004 | Baschy | ................... | G06F 21/62 715/781 |
| 2008/0088865 A1* | 4/2008 | Nagai | ................... | G06F 3/1285 358/1.13 |
| 2008/0231914 A1* | 9/2008 | Motoyoshi | ......... | H04N 1/00453 358/474 |
| 2011/0128247 A1* | 6/2011 | Sensu | ................... | H04N 1/0049 345/173 |
| 2013/0286435 A1* | 10/2013 | Anezaki | ............. | H04N 1/00503 358/1.15 |

FOREIGN PATENT DOCUMENTS

JP     2001-273181 A    10/2001

* cited by examiner

*Primary Examiner* — Thomas D Lee
(74) *Attorney, Agent, or Firm* — Global IP Counselors, LLP

(57) ABSTRACT

A recording medium storing a computer program that causes a computer to control a multifunctional machine having a copy function and a scan function and causes the computer to execute a process, the process including receiving a setting of a copy gesture corresponding to the copy function, receiving a setting of a scan gesture corresponding to the scan function, broadcasting to users who are permitted to use the copy function a message including the copy gesture such that the users can recognize the copy gesture, broadcasting to users who are permitted to use the scan function a message including the scan gesture such that the users can recognize the scan gesture, and causing the multifunctional machine to execute control such that, when the copy gesture is received, the multifunctional machine performs copying and, when the scan gesture is received, the multifunctional machine performs scanning is configured.

9 Claims, 7 Drawing Sheets

| FUNCTION | USE LIMIT OR NOT | PATTERN | STATE |
|---|---|---|---|
| COPY | USE LIMIT | PATTERN A | LOCKED |
| SCAN | USE LIMIT | PATTERN B | LOCKED |
| FACSIMILE | USE LIMIT | PATTERN C | LOCKED |
| WIRELESS | NO USE LIMIT | — | — |
| SETTING | NO USE LIMIT | — | — |

| FUNCTION | | USE LIMIT OR NOT | PATTERN | STATE |
|---|---|---|---|---|
| COPY | ONE COPY OR LESS/TIME | USE LIMIT | PATTERN A1 | UNLOCKED BY PATTERN A1 |
| | FIVE COPIES OR LESS/TIME | | PATTERN A2 | |
| | NO LIMIT ON NUMBER OF COPIES | | PATTERN A3 | |
| SCAN | | USE LIMIT | PATTERN B | LOCKED |

RECORDING MEDIUM STORING CONTROL PROGRAM AND ELECTRONIC DEVICE FOR CONTROLLING USE OF FUNCTION

The present application is based on, and claims priority from JP Application Serial Number 2019-102217, filed May 31, 2019, the disclosure of which is hereby incorporated by reference herein in its entirety.

BACKGROUND

1. Technical Field

The present disclosure relates to electronic devices which perform gesture control.

2. Related Art

Electronic devices in which propriety of use of each function thereof is set for each user have been known (for example, see JP A-2001-273181).

It is, however, complicated for an administrator to set and manage propriety of use of each function for each user.

SUMMARY

A recording medium storing a control program which solves the above described problem is a recording medium storing a control program that causes a computer to control a multifunctional machine having a copy function and a scan function and causes the computer to execute a process including receiving a setting of a copy gesture corresponding to the copy function, receiving a setting of a scan gesture corresponding to the scan function, broadcasting to users who are permitted to use the copy function a message including the copy gesture such that the users can recognize the copy gesture, broadcasting to users who are permitted to use the scan function a message including the scan gesture such that the users can recognize the scan gesture, and causing the multifunctional machine to execute gesture control such that, when the copy gesture is received, the multifunctional machine performs copying and, when the scan gesture is received, the multifunctional machine performs scanning.

A user who has been notified of the copy gesture is a user who is permitted to use the copy function and can use the copy function by performing the copy gesture on the multifunctional machine. A user who has been notified of the scan gesture is a user who is permitted to use the scan function and can use the scan function by performing the scan gesture on the multifunctional machine. In order to cause users who are permitted to use the copy function to be able to use the copy function, the administrator sets a copy gesture and performs an operation of selecting users to be permitted to use the copy function and instructing broadcast of the copy gesture to the users. In order to cause users who are permitted to use the scan function to be able to use the scan function, the administrator sets a scan gesture and performs an operation of selecting users to be permitted to use the scan function and instructing broadcast of the scan gesture to the users. Therefore, in the above described configuration, the administrator is not required to set propriety of use of the copy function and propriety of use of the scan function for each user. Therefore, according to the recording medium storing the control program, propriety of use of each of functions (a copy function and a scan function) of a multifunctional machine can be controlled by a simple method.

An electronic device that solves the above described problem is an electronic device having a plurality of functions, and includes an executing section that executes a function designated by a user, a receiving section that receives a gesture of the user, and a permitting section that performs determination on whether the function designated by the user and the gesture of the user correspond to each other, based on corresponding data in which, for each function, a gesture is registered in association with the function in advance, permits, when the function designated by the user and the gesture of the user correspond to each other, execution of the function corresponding to the gesture of the user by the executing section, and does not permit, when the function designated by the user and the gesture of the user do not correspond to each other, execution of the function corresponding to the gesture of the user by the executing section.

That is, in the electronic device, in a case in which the user designates one of the plurality of functions of the electronic device and performs a gesture, when the performed gesture is a gesture associated with the function, the user can use the function. However, when the performed gesture is not a gesture associated with the function, the user cannot use the function. Therefore, a user who knows a gesture associated with a function that the user desires to use can use the function (a user who does not know the gesture cannot use the function). A gesture is registered for each function in association with the function in advance, and the administer may only notify the gesture to users who are to be permitted to use the function and is not required to set propriety of use of each function for each user. Therefore, according to this configuration, propriety of use of each function of the electronic device can be controlled by a simple method.

The electronic device that solves the above described problem may be configured such that the user is not specified.

That is, a configuration in which the electronic device does not acquire information indicating who the user that has designated a function and has performed a gesture on the electronic device (does not perform individual user authentication) is may be employed. This configuration does not require a step executed for specifying a user and is convenient for users. Specifically, a user can use the function by inputting a gesture of a function that the user desires to use without inputting information indicating who the user himself or herself is. Moreover, this configuration does not require a step executed for specifying a user, and therefore, the electronic device may not be configured such that information used for specifying who the user is recorded.

The electronic device that solves the above described problem may further include a specifying section configured to specify the user before the gesture of the user is received, and a history section configured to cause the specified user and an operation performed by the specified user to be stored as a history in association with each other.

That is, a configuration in which it is specified who the user that designates a function and performs a gesture on the electronic device is (individual user authentication is performed) before the gesture is received and an operation history of the specified user is accumulated may be employed. Thus, an administrator can perform an operation using the user's operation history including unauthorized use (for example, use of a certain function by a user who is not permitted to use the function by performing the gesture used for using the function, or the like).

The electronic device that solves the above described problem may further include a display section configured to display an icon corresponding to a function, and may be configured such that the display section additionally displays a reference image that is a reference used when the user performs a gesture near the icon in response to a touch on the icon, and the permitting section performs the determination, based on a premise that the touch on the icon is designating the function by the user.

According to this configuration, the user can select a function that the user desires to use and instruct display of the reference image used for gesture input by touching corresponding icons displayed on the display section. The reference image is displayed, and thus, the user can more easily input the gesture, as compared to a case in which the reference image is not displayed.

The electronic device that solves the above described problem may be configured such that, in response to the touch on the icon, the display section additionally displays the reference image with a touched position centered.

In this configuration, as compared to a configuration in which the reference image is additionally displayed with a position apart from the touched position centered, the user can easily recognize the reference image used for gesture input for the function selected by the user.

The electronic device that solves the above described problem may further include a display section configured to display an icon corresponding to a function, and may be configured such that the display section enlarges and displays the icon in response to a touch on the icon, the receiving section receives a gesture on the enlarged icon, and the permitting section performs the determination, based on a premise that the touch on the icon is designating a function by the user.

According to this configuration, the user can perform designation of a function that the user desires to use by touching the icon displayed on the display section. Furthermore, for example, when the icon before being enlarged and displayed is too small to be suitable for gesture input, it can be made easier by receiving a gesture on an enlarged and displayed icon obtained by enlarging and displaying the icon touched as in this configuration for the user to input a gesture, as compared to a configuration in which a gesture is received on the icon without enlarging and displaying the icon.

The electronic device that solves the above described problem may further include a display section configured to display an icon corresponding to a function such that an icon of a function for which a permission is required in executing the function and an icon of a function for which a permission is not required in executing the function are distinguished from each other.

According to this configuration, the user can easily distinguish a function for which gesture input is required for using the function and a function that can be used without gesture input from each other.

The electronic device that solves the above described problem may be configured such that the display section automatically re-arrays an array of icons.

There is a probability that a gesture associated with a function is known by a user who is not permitted to use the function from a trace (for example, a trace of sebum of the finger or the like) of a gesture which has been made by a contact to a touch panel of the display section and remains on the touch panel. As in this configuration, a probability that a gesture associated with a function is leaked can be reduced by automatically re-arraying an array of icons displayed on the display section.

DESCRIPTION OF EXEMPLARY EMBODIMENTS

Embodiments of the present disclosure will be described in the following order:
1. a configuration of a multifunctional machine;
2. pattern registration processing;
3. use propriety determination processing; and
4. another embodiment.

1. Configuration of Multifunctional Machine

Figure 1:
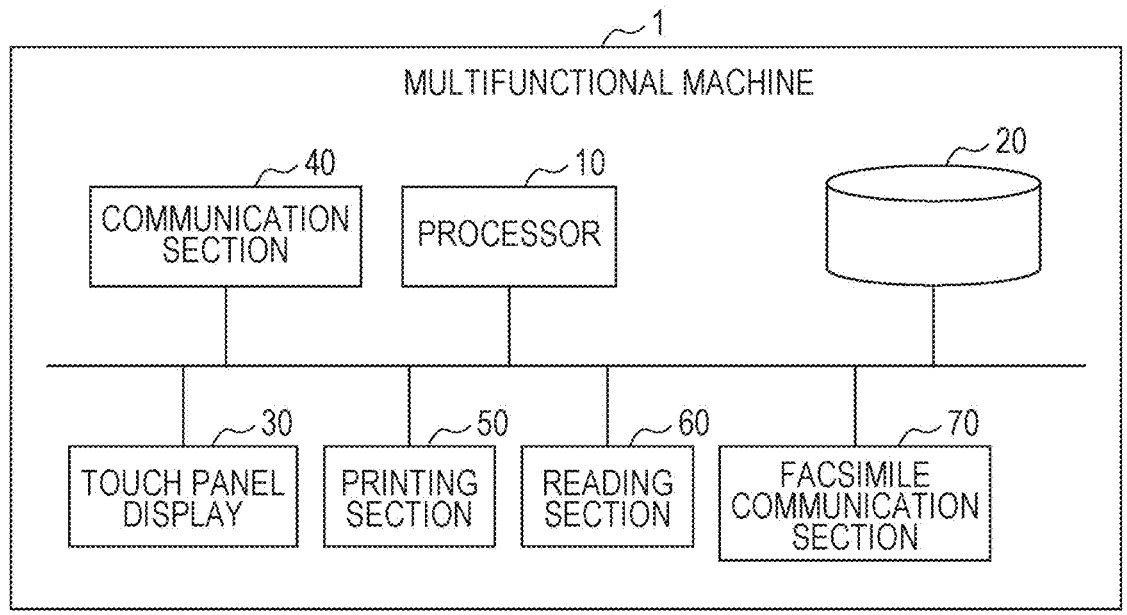
FIG. 1 is a block diagram illustrating a configuration of a multifunctional machine.

FIG. 1 is a block diagram illustrating a configuration of a multifunctional machine 1 according to an embodiment of the present disclosure. The multifunctional machine 1 includes a processor 10, a non-volatile memory 20, a touch panel display 30, a communication section 40, a printing section 50, a reading section 60, and a facsimile communication section 70. The processor 10 includes a CPU, a ROM, a RAM, or the like (not illustrated) and executes various programs recorded in the non-volatile memory 20 to control each section of the multifunctional machine 1. Note that the processor 10 may be formed of a single chip and may be formed of a plurality of chips. Moreover, for example, an ASIC may be employed instead of the CPU, and the CPU and an ASIC may be cooperated with each other.

The touch panel display 30 (corresponding to a display section) includes a display panel that displays various information, based on control by the processor 10, and a touch detection panel superposed on the display panel, and detects a touch operation by a finger of a person or the like. The touch panel display 30 outputs information indicating the touch operation to the processor 10. The processor 10 acquires the touch operation performed by a user, based on the information.

The communication section 40 includes various types of communication interfaces used for communicating with an external device via a wired or wireless communication. The communication section 40 also includes an interface used for communicating with various types of removable memories attached to the multifunctional machine 1. In this embodiment, the printing section 50 includes an actuator, a sensor, a driving circuit, a machine part, or the like used for executing printing on various types of printing media by various types of printing methods, such as an ink jet system, electrophotography, or the like.

The reading section 60 includes a device, such as, for example, a known color image sensor or a known light source, used for reading an original document mounted on an original document stand glass or an original document set in an ADF tray, an actuator, a driving circuit, a sensor, a machine part, or the like used for transporting the original document. The facsimile communication section 70 includes a modem used for performing a facsimile communication of image data indicating an original document via a public switched telephone network or the like, a circuit that detects or generates a control signal used for transmitting and receiving the image data, a circuit used for encoding transmission data and decoding reception data, and the like.

In this embodiment, it is assumed that the multifunctional machine 1 is, for example, installed in an office or the like and is used for a plurality of users. An affiliation (a company, a department), a position, or an occupation of each user, a project in which the user participates, or the like varies. The multifunctional machine 1 is shared by the plurality of users, and therefore, for example, unlike a personal computer (PC) or the like, there are not many cases in which one user possesses the multifunctional machine 1 and uses a plurality of applications in parallel for a certain time period. In many cases, a user comes up to the multifunctional machine 1 and directly operates the multifunctional machine 1 to use one function.

Figure 2:
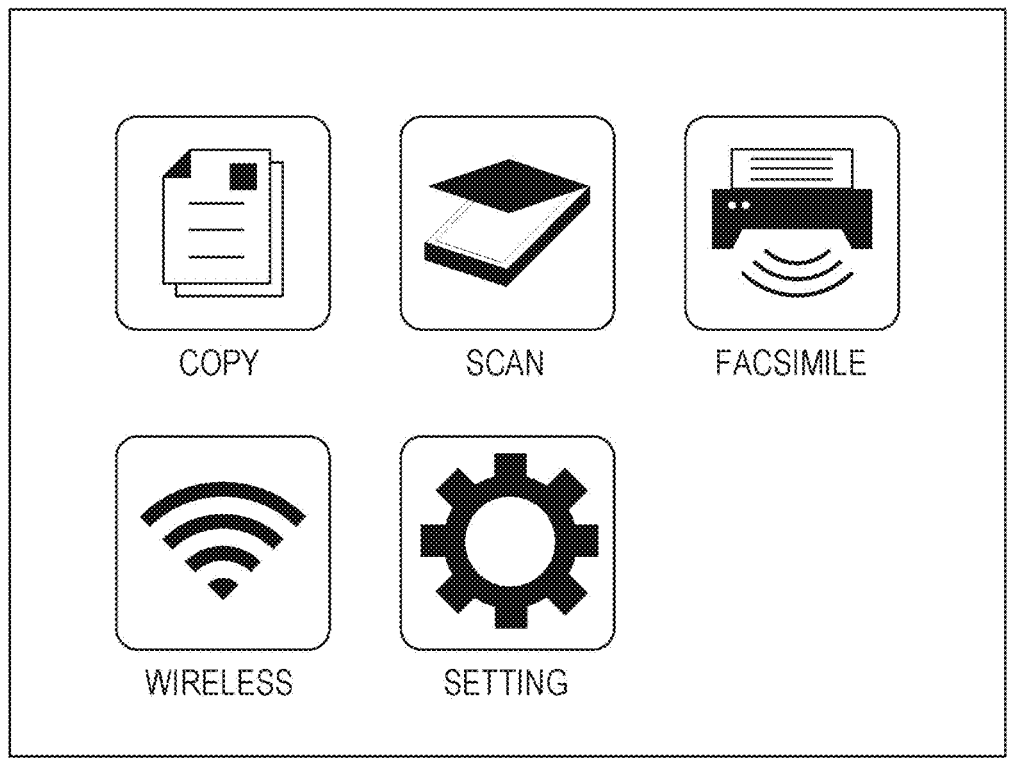
FIG. 2 is a view illustrating an example of a function list screen.

The multifunctional machine 1 has a plurality of functions including a copy function, a scan function, a facsimile function, a wireless function, various setting functions, or the like. In this embodiment, icons indicating these functions of the multifunctional machine 1 are associated with the functions and, as illustrated in FIG. 2, are indicated on a function list screen displayed on the touch panel display 30. Based on a premise that various events realizable by executing a program group associated with each of the icons listed in the function list screen are functions associated with the icons, this embodiment is described.

As described above, the multifunctional machine 1 has various functions. There is a probability that, when, for all users, use of all of the functions is permitted without any limit, inconveniences in operation occur. Therefore, as an option, in a case in which a function which can be used and a function which cannot be used are registered for each user in advance, when the user uses the multifunctional machine 1, user authentication (for example, authentication using an ID and a password) is performed first and control is performed based on registration contents (registration contents for propriety of use of each function) for authenticated users such that use of a usable function is permitted and unusable function cannot be used. However, an operation of registering and managing (revising, correcting, changing, or the like) the propriety of use of each function for each user is complicated for an administrator.

Therefore, in this embodiment, a configuration in which the propriety of use of each function for each user is registered is not employed, a function use of which is limited (a function that is not usable for all of users) is usually locked, and then, control is performed such that, when the function is locked, the user cannot use the function and, when the function is unlocked, the user can use the function. A lock of the function is configured to be able to be unlocked by inputting a pattern (corresponding to a gesture) registered in association with the function in advance by the gesture on the touch panel display 30. As described above, control in which whether the gesture of the user matches the pattern registered in advance is determined and propriety of use for the user is controlled based on a result of the determination will be also called gesture control. For example, a gesture of putting a finger over a reader when fingerprint authentication is performed is used, but control in which a gesture itself is not determined is not called gesture control herein.

Figure 6:
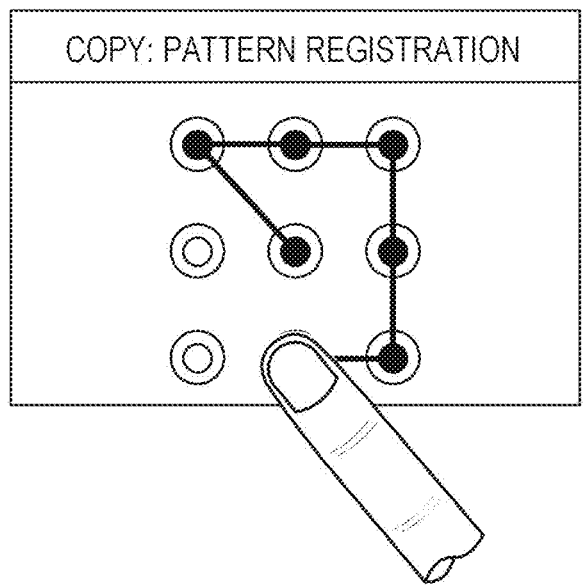
FIG. 6 is a view illustrating an example of a pattern registration screen.

More specifically, in this embodiment, for example, as illustrated in FIG. 6, the pattern is information indicating a track of tracing nine points arranged in three rows and three columns displayed on the touch panel display 30. In this embodiment, the points arranged in three rows and three columns correspond to a reference image. For example, an identification number corresponding to a position on an array of three rows and three columns is associated with each point and the information indicating the pattern may be information (an identification number sequence) represented by the identification numbers arranged in an order in which the points were traced.

Figures 3, 4:
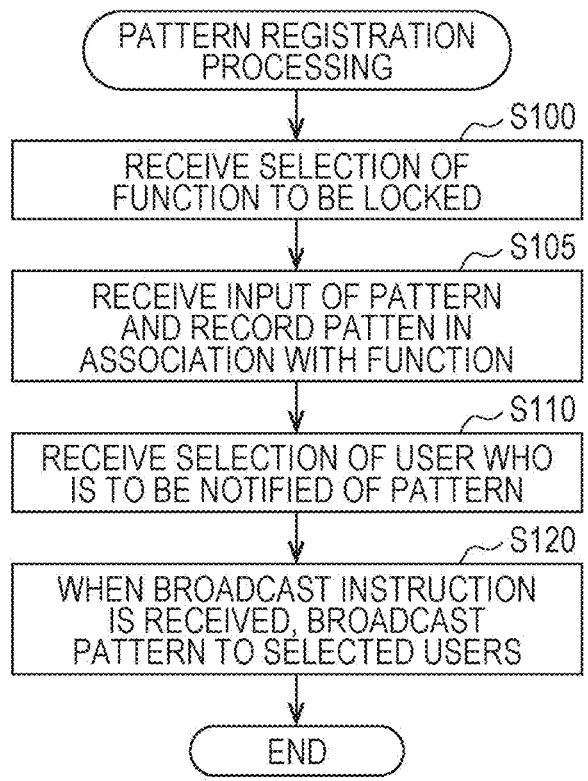
FIG. 3 is a table illustrating an example of corresponding data.
FIG. 4 is a flowchart of pattern registration processing.

In order to realize the above described configuration, in this embodiment, a function use of which is limited and corresponding data associated with the above described pattern are recorded in the non-volatile memory 20. FIG. 3 illustrates an example of the corresponding data. In the example of FIG. 3, among the plurality of functions of the multifunctional machine 1, there is a limit for use of each of the copy function, the scan function, and the facsimile function, and patterns A, B, and C are recorded in association with the copy function, the scan function, and the facsimile function, respectively. Note that, in this embodiment, it is assumed that the patterns A, B, and C are different patterns (not excluding a case in which the patterns A, B, and C are the same pattern in a different embodiment). In the example of FIG. 3, each of the copy function, the scan function, and the facsimile function are currently locked. As will be described later, when a pattern associated with a function is input, a lock of the function is unlocked (the function is unlocked).

An administrator of the multifunctional machine 1 broadcasts to users who are permitted to use a locked function a message including a pattern used for unlocking the function such that the users can recognize the pattern. In this embodiment, a configuration in which the message is broadcasted via an e-mail is employed. In the multifunctional machine 1, settings for sending an e-mail have been set by the administrator in advance.

The administrator may select a representative mail address of an existing mailing list as a destination address of an e-mail. When an e-mail is sent to the representative address of the mailing list, the e-mail is broadcasted to mail addresses registered in the mailing list. The mailing list may be created for each of various attributes, such as a belonging company or department, a position, an occupation, a project, or the like. The representative address of the mailing list may be included in an address book recorded, for example, in the non-volatile memory 20 or in a recording medium of some other device that the multifunctional machine 1 can access. The administrator can refer to the address book and select a mailing list corresponding to a group of users whom the administrator desires to permit for use of a function.

For example, the message including the pattern such that the users can recognize the pattern may be configured to be sent with attachment of an image file indicating an order of tracing the points arranged in three rows and three columns, and may be configured to be sent with text data of the above described identification number sequence included in an e-mail text. The text data indicating the order of tracing may be configured to indicate a position of a starting point and a vector (an orientation and a magnitude) to a subsequent point (for example, starting from a point in the middle, moving one to right, and moving one to lower left, or the like).

2. Pattern Registration Processing

Figure 5:
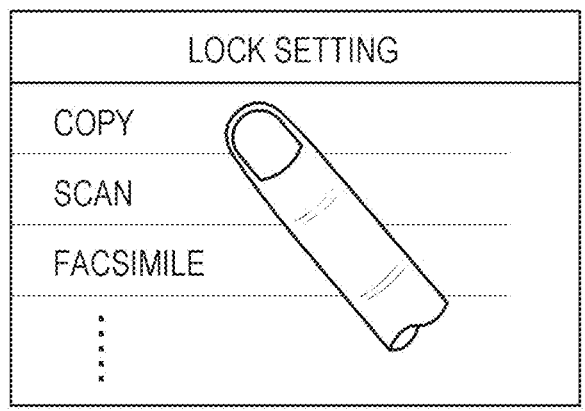
FIG. 5 is a view illustrating an example of a screen via which a function to be locked is selected.

Next, processing of limiting (locking) use of an arbitrary function will be described. FIG. 4 is a flowchart illustrating pattern registration processing. Pattern registration processing starts when the administrator inputs an instruction of locking a function via the touch panel display 30. When the pattern registration processing starts, the processor 10 receives selection of a function to be locked (Step S100). That is, the processor 10 indicates a list of functions of the multifunctional machine 1 and urges selection of a function to be locked. FIG. 5 illustrates a screen display example in this case. When the administrator selects one of listed functions, the processor 10 acquires information indicating the selected function. Herein, based on a premise that the copy function is selected, the description of the processing continues.

Figure 7:
FIG. 7 is a view illustrating an example of a pattern registration screen.

Subsequently, the processor 10 receives an input of a pattern and records the pattern in association with the function (Step S105). The processor 10 causes the touch panel display 30 to display the points arranged in three rows and three columns used for inputting the pattern. When the user traces the points from point to point in order, the processor 10 acquires identification numbers of the points traced in an order of tracing. When removal of a finger of the user from the touch panel display 30 is detected, the processor 10 records information (an identification number sequence) indicating a track traced by the user as information indicating the pattern in association with the function in the non-volatile memory 20 (corresponding data) (see, for example, FIG. 3). The processor 10 records the function as a function use of which is limited in the corresponding data. Furthermore, the processor 10 puts the function in a locked state. Gesture control is executed by storing the function in the corresponding data and putting the function in a locked state in the above described manner. FIG. 6 is a view illustrating an example of a pattern to be registered in association with the copy function. As described in FIG. 6, when the administrator finishes inputting the pattern and removes the finger from the touch panel display 30, the processor 10 displays a screen indicating that locking is completed as illustrated in FIG. 7.

Subsequently, the processor 10 receives selection of a user who is to be notified of the pattern (Step S110). For example, after the processor 10 has displayed the screen illustrated in FIG. 7 for a certain time, the processor 10 displays a pattern transmission screen and urges the administrator to select a mail address of a user who is to be notified of the pattern. The administrator operates the touch panel display 30 to refer to the address book and selects a representative address of a desired mailing list included in the address book. For example, the administrator can select a representative address of a mailing list corresponding to a group of users who are to be permitted to use the copy function. The processor 10 can acquire the selected representative address as a destination mail address to which notification of the pattern is sent.

Subsequently, when the processor 10 receives a broadcast instruction, the processor 10 broadcasts the pattern to selected users (Step S120). For example, when the administrator touches a transmission button on a pattern transmission screen, the processor 10 determines that a broadcast instruction has been input. When the processor 10 determines that the broadcast instruction has been input, the processor 10 generates an image file indicating the pattern, based on the identification number sequence indicating the pattern, and transmits an e-mail to which the image file is attached and which is addressed to an address received in the Step S110. As a result, the e-mail with attachment of the image file indicating the pattern used for unlocking the function is sent to users corresponding to a plurality of mail addresses registered in the mailing list.

For example, a user who has been notified of an unlocking pattern for the copy function is a user who is permitted to use the copy function. The user can use the copy function by inputting the notified pattern to the multifunctional machine 1. The administrator may perform an operation of setting a pattern (a copy gesture) to be associated with the copy function, selecting users who are to be permitted to use the copying pattern, and instructing simultaneous notification of the pattern corresponding to the copy function. For another function, that is, for example, the scan function, which is different from the copy function, a pattern (a scan gesture) corresponding to the scan function can be notified to a user to be permitted to use the scan function in a similar manner. Similar applies to still another function, such as the facsimile function or the like. As described above, according to this embodiment, the administrator is not required to set propriety of use of the copy function and propriety of use of the scan function for each user. Therefore, in this embodiment, propriety of use of the multifunctional machine can be controlled in a simple manner.

3. Use Propriety Determination Processing

Figure 8:
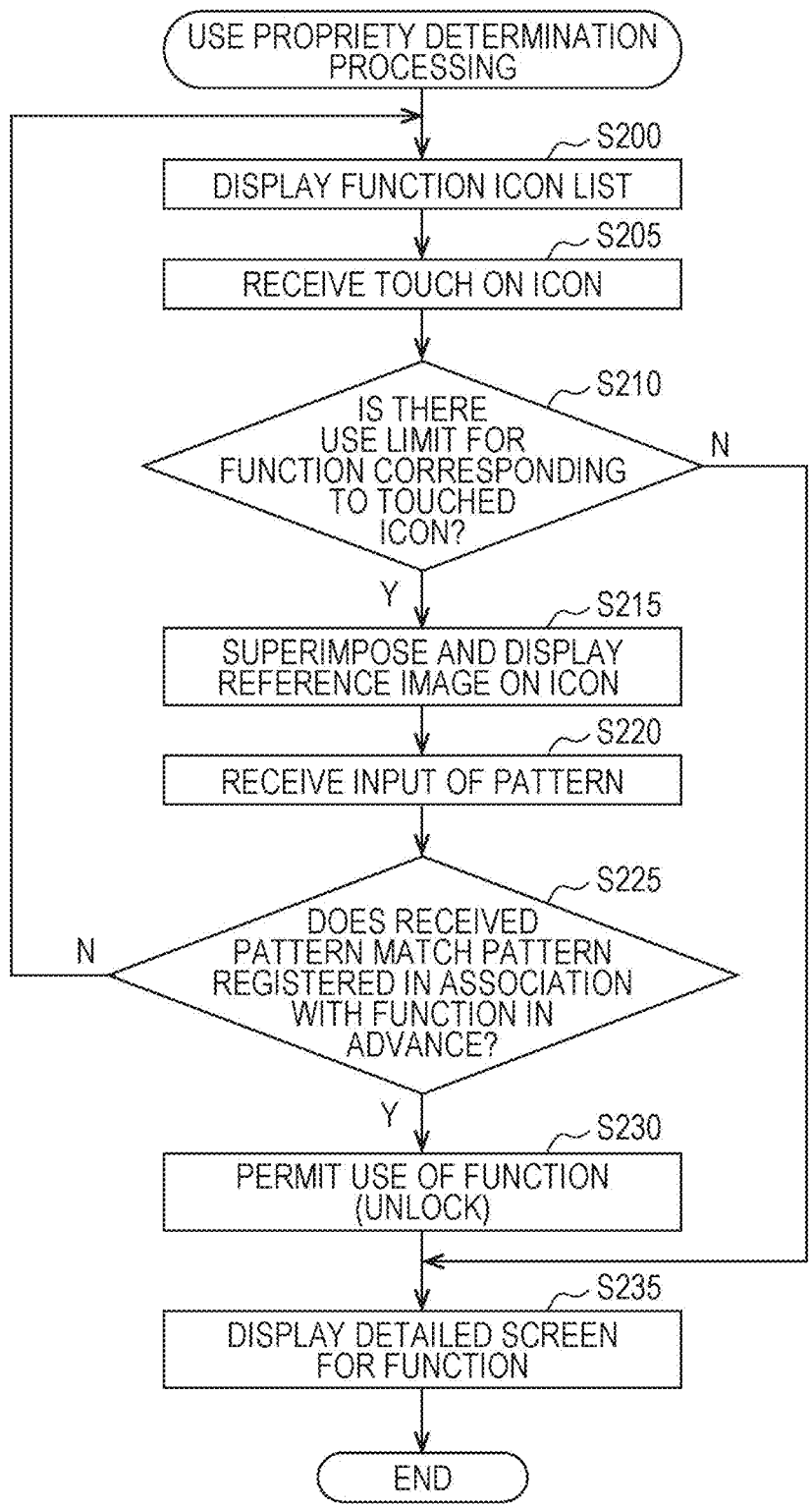
FIG. 8 is a flowchart of use propriety determination processing.
Figure 9:
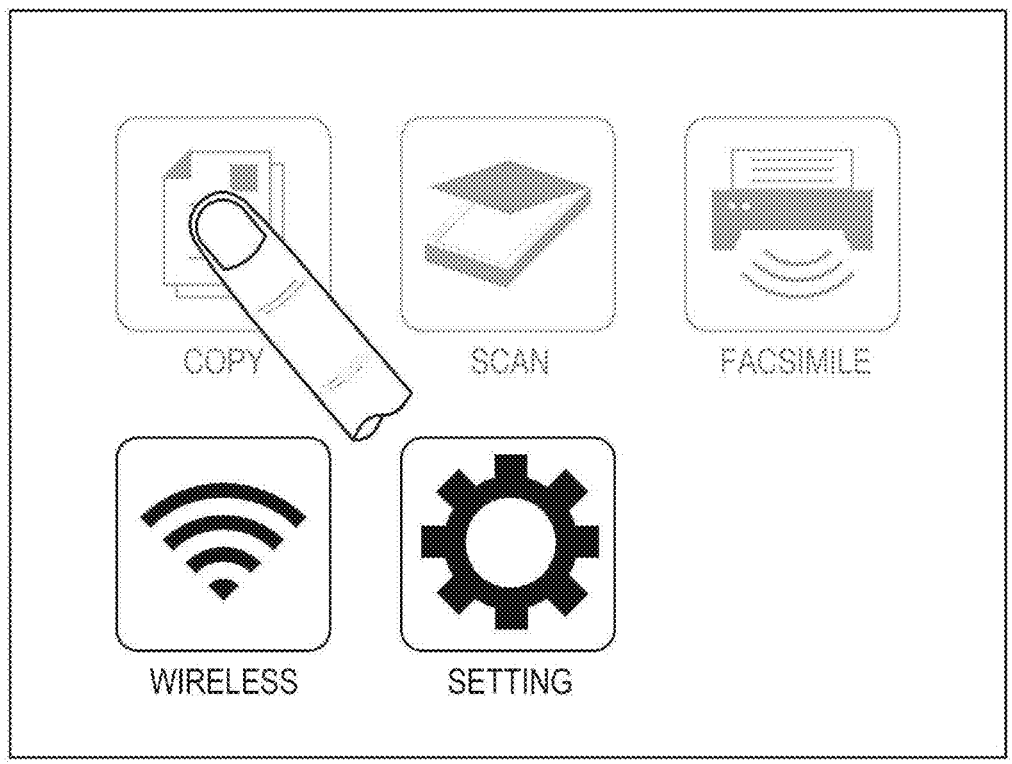
FIG. 9 is a view illustrating a touch on an icon in a locked state.

Next, processing that is executed when a user comes up to the multifunctional machine 1 and directly operates the multifunctional machine 1 to use one of the functions of the multifunctional machine 1 will be described. FIG. 8 is a flowchart illustrating use propriety determination processing. When a display request for the function list screen of the multifunctional machine 1 is acquired, the use propriety determination processing is executed by the processor 10. When the use propriety determination processing starts, the processor 10 displays a function icon list (Step S200). The processor 10 causes the touch panel display 30 to display respective icons of the functions of the multifunctional machine 1. At this time, for each of the functions, the processor 10 causes display of the icons such that an icon of a function use of which is not limited (which is not locked) is displayed in a normal form and an icon of a function use of which is limited (which is locked) is displayed with a lower saturation than that in the normal form (displayed in a grayout state). For example, FIG. 9 illustrates a display example of a case in which the copy function, the scan function, and the facsimile function are locked and the wireless function and various setting functions are not locked.

As described above, a configuration in which an icon corresponding to a function is displayed such that an icon of a function for which a permission is required in executing the function and an icon of a function for which a permission is not required in executing the function can be distinguished from each other is employed, and thus, a user can easily distinguish a function for which the user is required to input an unlocking pattern to use the function and a function which the user can use without inputting an unlocking pattern from each other.

Subsequently, the processor 10 receives a touch on an icon (Step S205). That is, the processor 10 stands by for a touch operation on the touch panel display 30. When the processor 10 detects the touch operation, the processor 10 determines whether a touch position is in a display area of one of the icons. When the touch position is in the display area of one of the icons, the processor 10 specifies a function associated with the icon. Note that a touch operation on an icon by a user corresponds to specifying a function which the user is desired to use by the user.

Subsequently, the processor 10 determines whether there is a limit for use of the function corresponding to the touched icon (Step S210). That is, the processor 10 refers to corresponding data (for example, see FIG. 3) and determines whether there is a limit for use of the function associated with the icon.

In Step S210, when it is not determined that there is a limit for use of the function, the processor 10 displays a detailed screen of the function (Step S235). That is, when the icon of the function use of which is not limited (the function that can be used without patter input) is touched, the processor 10 displays the detailed screen of the function without executing Steps S215 to S230, which will be described later. For example, in a state in which a function list screen illustrated in FIG. 9 is displayed, when an icon of the wireless function use of which is not limited is touched, the processor 10 displays a detailed screen of the wireless function and transitions to a state in which the processor 10 receives an operation of the user for the wireless function.

Figure 10:
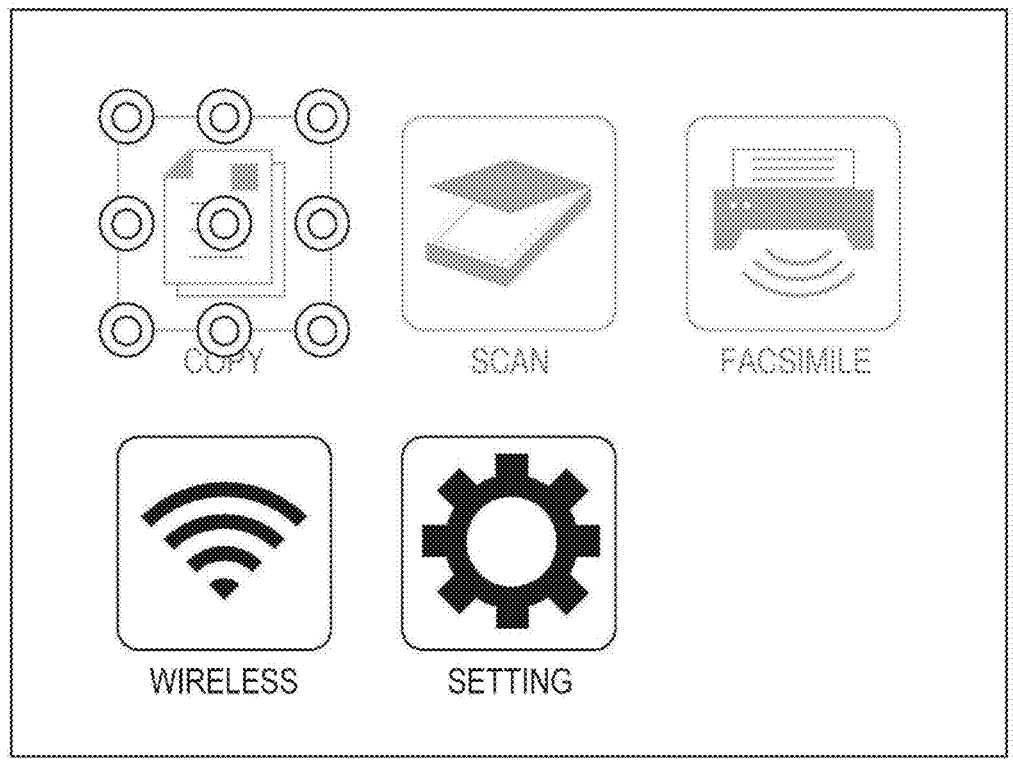
FIG. 10 is a view illustrating a display example of a reference image used for pattern input.

In Step S210, when it is determined that there is a limit for use of the function, the processor 10 superimposes and displays a reference image on the icon (Step S215). In response to a touch on the icon of the function use of which is limited, the processor 10 superimposes and displays nine points (corresponding to the reference image) in three rows and three columns on the icon, as illustrated in FIG. 10. Due to superimposition display of the nine points in three rows and three columns on the touched icon, the user can input the pattern more easily than in a case in which the points are not displayed. The user selects a function that the user desires to use and also instructs display of the reference image used for gesture input by merely touching the icon, and this configuration is convenient for the user as compared to a configuration in which selection of a function and display instruction are executed by different operations.

Figures 11, 12:
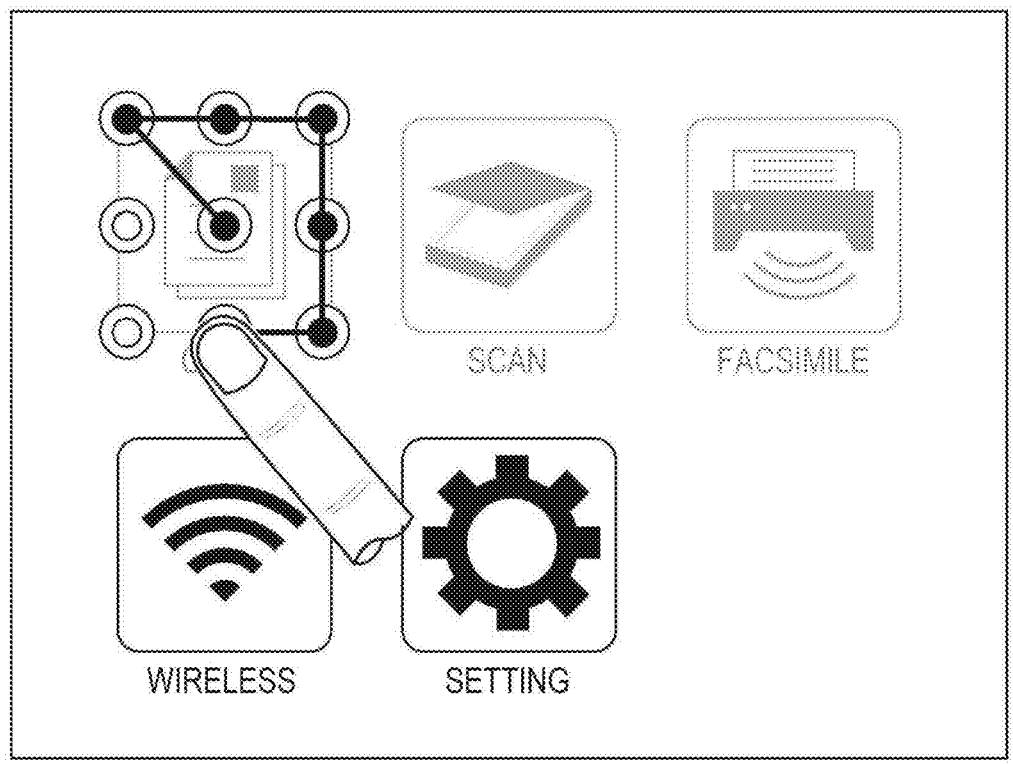
FIG. 11 is a view illustrating an example of a pattern input operation.
FIG. 12 is a table illustrating an example of corresponding data according to another embodiment.

Subsequently, the processor 10 receives input of a pattern (Step S220). For example, as illustrated in FIG. 11, when the user traces the points forming an array of three rows and three columns displayed on the touch panel display 30 from point to point and removes the finger from the touch panel display 30, the processor 10 acquires, as information indicating the pattern, information (an identification number sequence) indicating a track of tracing by the user. In this case, the processor 10 corresponds to a receiving section.

Subsequently, the processor 10 determines whether the received pattern matches a pattern registered in association with a function in advance (Step S225). That is, the processor 10 refers to the corresponding data (for example, see FIG. 3) recorded in the non-volatile memory 20 and acquires information indicating a pattern registered in association with the function designated in Step S205. Then, the processor 10 determines whether the information indicating the pattern acquired in Step S220 matches the information indicating the pattern registered in association with the function designated in Step S205.

In Step S225, when it is not determined that the received pattern matches the registered pattern, the processor 10 returns to the processing of Step S200. That is, the function corresponding to the icon designated in Step S205 is not unlocked and the icon is still displayed in a grayout state in the function list screen.

In Step S225, when it is determined that the received pattern matches the registered pattern, the processor 10 permits use of the function (Step S230). That is, the processor 10 unlocks the function designated in Step S205. For example, when Step S230 is executed for the copy function use of which is limited, as illustrated in FIG. 3, the processor 10 switches the state of the copy function from a locked state to an unlocked state. When Steps S225 and S230 are executed, the processor 10 corresponds to a permitting section.

Subsequently, the processor 10 displays a detailed screen of the function (Step S235). That is, when the icon of the locked function is touched, the processor 10 executes Steps S215 to S230 to unlock the function, and then, displays the detailed screen of the function. For example, when the icon of the copy function that is locked is touched in a state in which the function list screen illustrated in FIG. 9 is displayed, the processor 10 displays a detailed screen of the copying machine and transitions to a state in which the processor 10 receives an operation of the user for the copy function. In this case, the user can use the designated function. The processor 10 also executes a function designated by the user, and therefore, the processor 10 in this case corresponds to an executing section.

As described above, in this embodiment, a configuration in which a user who uses the multifunctional machine 1 is not specified is employed. That is, a configuration in which the processor 10 does not acquire information indicating who the user that has designated a function on and has inputted a pattern for unlocking to the multifunctional machine 1 is (does not perform individual user authentication) is employed. In this case, a step executed for specifying the user is not required, and this configuration is convenient for the user. Specifically, the user can use the function by inputting a gesture of a function that the user desires to use without inputting information (for example, an ID or a password) indicating who the user himself or herself is. In this configuration, a step executed for specifying the user is not required, for example, the multifunctional machine 1 is not required to record the information used for specifying who the user is. Therefore, according to this configuration, propriety of use of each function of the multifunctional machine 1 can be controlled by a simple manner.

Note that, when a display request for the function list screen is acquired again (for example, after a certain time has elapsed since a last operation, when a home button operation is performed, or the like), the processor 10 may be configured to automatically put the function in an unlocked state back in a locked state.

4. Another Embodiment

The above described embodiment is merely an example of a mode for carrying out the present disclosure and various other embodiments may be employed. For example, the present disclosure is applicable to, in addition to a multi-functional machine having a copy function and a scan function, various electronic devices each of which can selectably indicate a plurality of functions to users. Accordingly, in this case, in a recording medium storing a control program, the control program may be a control program that causes a computer to control an electronic device having a plurality of functions and be configured to cause the computer to receive a setting of a gesture for each function, generate corresponding data with which the gesture received for each function is associated, and broadcast a message including the gesture received for each function such that users can recognize the gesture. The recording medium may be configured such that the control program is executed by a computer mounted on an electronic device and may be configured such that the control program is executed by some other device (for example, a server or a PC of the administrator) communicably connected to the electronic device, and a combination of the above described configurations may be employed.

Accordingly, for example, reception of a setting of a gesture for each function, generation of corresponding data in which the received gesture and a corresponding function are associated with each other, and broadcast of a message including the gesture received for each gesture such that users can recognize the gesture may be executed by the electronic device and may be executed by some other device, and some of the reception, the generation, and the broadcast may be executed by the electronic device and the other one(s) may be executed by some other device. The corresponding data in which the function and the gesture are associated with each other may be stored in anywhere as long as the electronic device can refer to the corresponding function. The corresponding data may be stored in a recording medium of the electronic device, may be stored in a device which a user used to set (register) a gesture, and may be stored in a recording medium of a different device from the electronic device and the device used by the user.

A function may be configured to indicate an entire one of various events that can be realized by executing a program associated with one icon, and may be configured to indicate a part of one of such various events. In the latter case, a copy function in which one copy or less are made at one time, a copy function in which five or less copies are made at one time, a copy function in which the number of copies is not limited, or the like may be assumed. In this case, as illustrated in FIG. 12, the administrator makes a gesture to be associated with the copy function of making one copy or less, a gesture to be associated with the copy function of making five or less copied, and a gesture to be associated with the copy function of making copies without any limit on the number of copies all different. The administrator broadcasts a pattern A1 to users who are to be permitted to use the copy function of making one copy or less, broadcasts a pattern A2 to users who are to be permitted to use the copy function of making five or less copies, and broadcasts a pattern A3 to users who are to be permitted to use the copy function of making copies without any limit on the number of copies. For example, when a user who has been notified of the pattern A1 inputs the pattern A1 to the multifunctional machine 1, the copy function is unlocked in a state in which the user can make one copy or less. A configuration in which, when one copying (that is, making one copy in this case) ends, a display state returns to the function list screen and, when the display state returns to the function list screen, an icon indicating a function of entire copying returns to a locked state may be employed.

Note that, in the example of FIG. 12, it is indicated that a user who knows a pattern B can use the scan function but a user who does not know the pattern B cannot use the scan function. The pattern A3 is a pattern that a user who is permitted to use the copy function of making copies without any limit on the number of copies knows. For example, the pattern A3 and the pattern B may be different from each other, and may be the same. That is, the same pattern may be registered for different functions.

One function may be associated with an icon displayed on one display section, and may not be associated with an icon. In the latter case, for example, a dedicated button may be associated with one function. A configuration in which a user designates a function that the user desires to use by selecting an icon or a button may be employed, and a configuration in which the user designates the function by inputting a character indicating the function via a keyboard or the like on the touch panel, or a speech may be employed. Any keyboard layout may be used.

A gesture may be represented by a touch (slide, tap, press, or the like) operation on a touch panel. The gesture represented by the touch operation on the touch panel may be input via pattern input described in the above described embodiment, and may be input via password input by a tap operation performed on each key of a keyboard displayed on a touch panel display. The gesture may be also represented by some other operation than an operation performed on the touch panel display. For example, the electronic device may be configured to photograph a user from two directions and acquire a three-dimensional gesture performed by the user in a different position from the touch panel.

As for broadcast of a message including a pattern, the message may be sent by various methods, such as, for example, an e-mail, a facsimile, an SNS, or the like. Broadcast of a message including a pattern may be realized by transmitting an e-mail to a representative address of a mailing list, and may be realized by individually selecting as a destination a mail address of a user whom the administrator desires to permit to use the function and sending an e-mail thereto. A configuration in which information indicating a gesture is stored in a cloud server and a destination of storage is notified to a target user via an e-mail, a facsimile, an SNS, or the like may be also employed for broadcast of a message including a pattern. Broadcast of a message including a pattern may be performed using some other program, for example, by broadcasting an e-mail using some other mail user agent. Any type of a communication transmission medium, system, or standard may be used for broadcast.

Furthermore, an electronic device according to the present disclosure may further include a specifying section configured to specify a user, a history section configured to cause the specified user and an operation that has been performed by the specified user in association with each other to be stored as a history. That is, a configuration in which the processor 10 specifies who a user that designates a function or performs a gesture on the electronic device is (individual user authentication is performed) by performing a log-in operation before or at the time when the gesture is received may be employed (however, it is not necessary to store a setting in which propriety of use is associated with each function for each user and setting contents. As a matter of course, for a function, such as a basic setting function, which only a very small number of users are permitted to operate, propriety of use may be associated with each function for each user). Furthermore, a configuration in which an operation history of the specified user is accumulated in a recording medium that the processor 10 can access may be employed. The recording medium may be provided in the multifunctional machine 1, and may be provided outside the multifunctional machine 1, that is, for example, in a server on a network, or the like. Thus, the user's operation history including unauthorized use (for example, use of a function by a user who is not permitted to use the function by performing a gesture used for using the function, or the like) or the like can be stored. Unauthorized use can be detected by analyzing the operation history. It can be a deterrence to unauthorized use to notify all of users in advance that the operation history is accumulated in the above described manner, and such notification is effective also when propriety of use is controlled by a simple method as in the present disclosure. Note that user authorization may be performed by inputting an ID and a password, may be performed by reading a bar code indicating an employee identification number on an employee ID card, reading an RF tag, or the like, and may be performed by biometric authentication. For example, a configuration in which, after a user logs in by inputting the ID and the password, a gesture is received from the user may be employed. A configuration in which the user performs a gesture while putting the RF tag over a reader may be employed. A configuration in which, while the user performs a gesture with a finger, fingerprint authentication is performed by reading the fingerprint of the finger may be employed.

Figure 13:
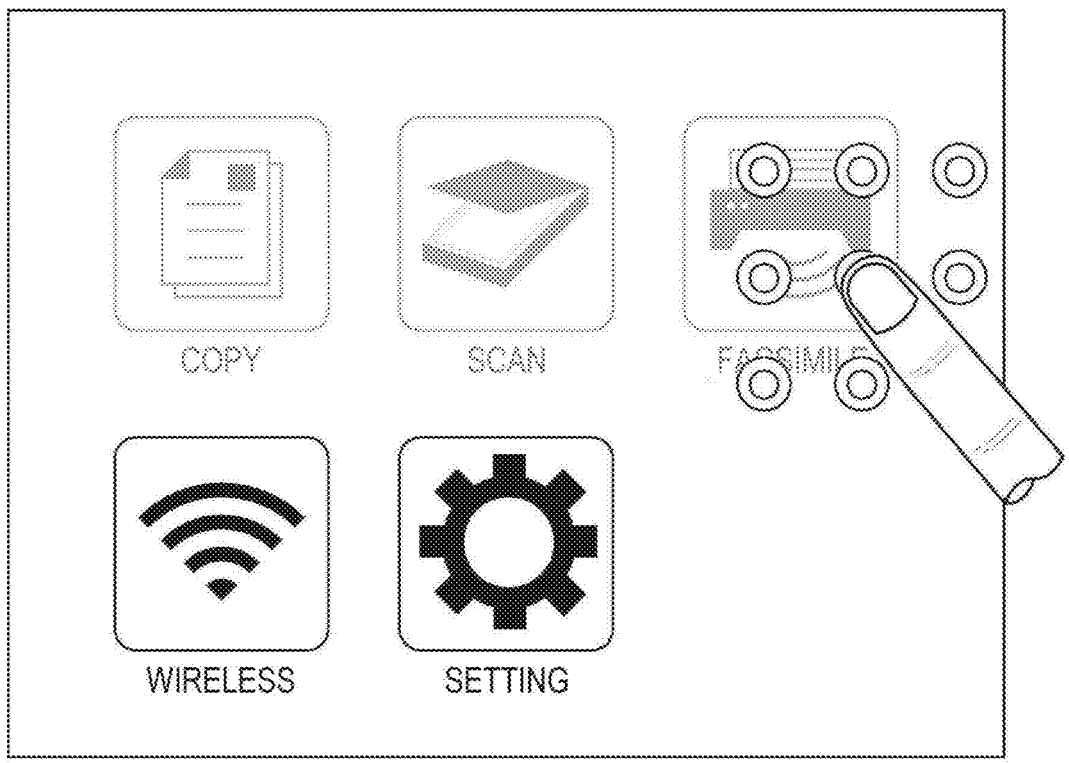
FIG. 13 is a view illustrating a display example of a reference image used for pattern input.

In response to a touch on an icon, a reference image may be displayed near the icon. Even when a touch position is located in a central portion of the icon or an edge portion of the icon, the reference image may be displayed in a position determined using the icon as a reference, and a display position of the reference image may differ depending on the touch position in a display area in which the icon is indicated. For example, in response to a touch of an icon, the reference image may be additionally displayed with a touched position centered. In this configuration, as compared to a configuration in which the reference image is additionally displayed with a position apart from the touch position centered, the user can easily recognize the reference image that is used for inputting a gesture corresponding to a function selected by the user. FIG. 13 illustrates a display example of points arranged in three rows and three columns (the reference image) when an edge portion of the icon at lower right is a touch position. As described above, the points arranged in three rows and three columns are displayed with the touch position centered, and thus, an average moving distance from the touch position to a starting point of the pattern can be reduced, as compared to a configuration in which the points arranged in three rows and three columns is displayed with a position apart from the touch position centered. Note that, as illustrated in FIG. 13, when, in response to a touch on the icon, the points arranged in three rows and three columns are displayed with the touch position centered, the user may shift to a pattern input operation without removing the finger from an initial icon touch, and may shift to a pattern input operation after removing the finger once. In the former case, as long as the pattern is configured such that a point in the middle of an array of three rows and three columns is set as a starting point, the user can perform function designation, reference image display, and pattern input in a period from one touch on an icon to a touch off from the icon.

Figure 14:
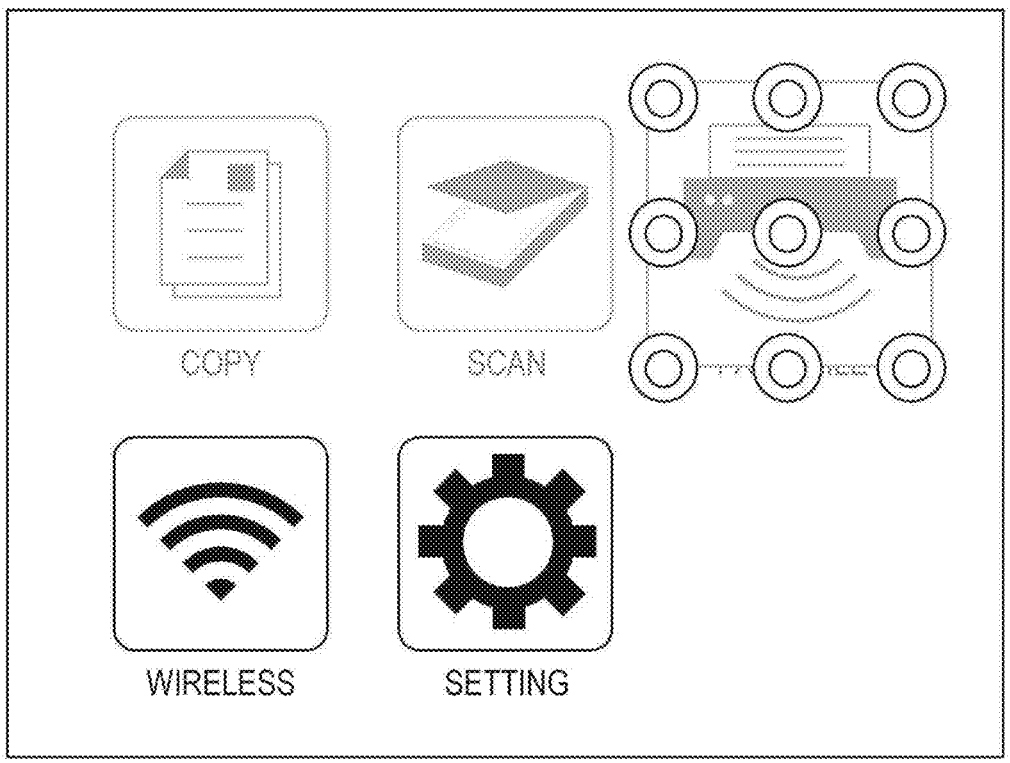
FIG. 14 is a view illustrating a display example of a reference image used for pattern input.

A configuration in which, in response to a touch on an icon, the icon is enlarged and displayed and a gesture is received on the enlarged icon may be employed (see FIG. 14). According to this configuration, for example, when the icon before being enlarged and displayed is too small to be suitable for gesture input, it can be made easier for the user to input a gesture, as compared to a configuration in which a gesture is received on the icon without performing enlarged display of the icon.

The display section may be configured such that an array of icons is automatically re-arrayed. Specifically, for example, a configuration in which an order or display positions of the icons arranged in the function list screen in the above described embodiment changes may be employed. There is a probability that a gesture associated with a function is known by a user who is not permitted to use the function from a trace (for example, a trace of sebum of the finger or the like) of a gesture which has been made by a contact to the touch panel and remains on the touch panel. As in this configuration, an array of icons displayed on the display section is automatically re-arrayed, and thus, a probability that a gesture associated with a function is leaked can be reduced.

Furthermore, the present disclosure is applicable as a program or a method that a computer executes. Each of the above described system, program, and method is realized as an individual device in some cases, and is realized using parts provided in a plurality of devices in other cases. The present disclosure includes various modes. The above described system, program, and method may be modified as appropriate and, for example, a portion of each of the above described system, program, and method may be formed of a software and may be formed of a hardware. Furthermore, even when the present disclosure can be implemented as a recording medium of a program that controls the system. Needless to say, the recording medium of the program may be a magnetic recording medium, may be a semiconductor memory and, similarly, may be any recording medium that will be developed in future.

What is claimed is:

1. A non-transitory computer recording medium storing a control program that causes a computer to control a multifunctional machine having a copy function and a scan function and causes the computer to execute a process, the process comprising:
   receiving a setting of a copy gesture corresponding to the copy function;
   receiving a setting of a scan gesture corresponding to the scan function;
   broadcasting to a plurality of users who are permitted to use the copy function a message including the copy gesture such that the users can recognize the copy gesture;
   broadcasting to a plurality of users who are permitted to use the scan function a message including the scan gesture such that the users can recognize the scan gesture; and
   causing the multifunctional machine to execute gesture control such that, when the copy gesture is received, the multifunctional machine permits copying and, when the scan gesture is received, the multifunctional machine permits scanning.

2. An electronic device having a plurality of functions, the electronic device comprising:

an executing section configured to execute a function designated by a user;

a receiving section configured to receive a gesture of the user; and a permitting section configured to permit, when the function is designated by the user and when a limit for the function does not exist, execution of the function by the executing section without the gesture of the user, and to perform, when the function is designated by the user and when the limit for the function exists, determination on whether the function designated by the user and the gesture of the user correspond to each other, based on corresponding data in which, for each function, a gesture of the user is registered in association with the function in advance, to permit, when the function designated by the user and the gesture of the user correspond to each other, execution of the function corresponding to the gesture of the user by the executing section, and not to permit, when the function designated by the user and the gesture of the user do not correspond to each other, execution of the function corresponding to the gesture of the user by the executing section.

3. The electronic device according to claim 2, wherein the user is not specified.

4. The electronic device according to claim 2, further comprising:

a specifying section configured to specify the user; and a history section configured to cause the specified user and an operation performed by the specified user to be stored as a history in association with each other.

5. The electronic device according to claim 2, further comprising:

a display section configured to display an icon corresponding to a function, wherein in response to a touch on the icon, when a limit for a function corresponding to the icon exists, the display section additionally displays a reference image that is a reference used when the user performs a gesture near the icon, and when the limit for the function corresponding to the icon does not exist, the display section does not additionally display the reference image, and the permitting section performs the determination, based on a premise that the touch on the icon is designating the function by the user.

6. The electronic device according to claim 5, wherein, in response to the touch on the icon, the display section additionally displays the reference image with a touched position centered.

7. The electronic device according to claim 5, wherein the display section automatically re-arrays an array of icons.

8. The electronic device according to claim 2, further comprising:

a display section configured to display an icon corresponding to a function, wherein in response to a touch on the icon, when a limit for a function corresponding to the icon exists, the display section enlarges and displays the icon, and when the limit for the function corresponding to the icon does not exist, the display section does not enlarge and display the icon, the receiving section receives a gesture on the enlarged icon, and the permitting section performs the determination, based on a premise that the touch on the icon is designating a function by the user.

9. The electronic device according to claim 2, further comprising:

a display section configured to display an icon corresponding to a function such that an icon of a function for which a limit exists and an icon of a function for which a limit does not exist are distinguished from each other.

\* \* \* \* \*